April 21, 1959   J. T. GATES   2,882,781
LOAD RELEASABLE NUT COMPRISING ARCUATE SEGMENTS
RESILIENTLY HELD TOGETHER
Filed March 1, 1955

INVENTOR.
JAMES T. GATES
BY
ATTORNEY

United States Patent Office 2,882,781
Patented Apr. 21, 1959

2,882,781

LOAD RELEASABLE NUT COMPRISING ARCUATE SEGMENTS RESILIENTLY HELD TOGETHER

James T. Gates, Cleveland Heights, Ohio, assignor to Cleveland Pneumatic Industries, Inc., Cleveland, Ohio, a corporation of Ohio Application March 1, 1955, Serial No. 491,366

1 Claim. (Cl. 85—33)

This invention relates generally to a nut structure adapted to be used with a threaded screw and more particularly to a structure incorporating means for automatically releasing the threaded engagement therewith when the axial load on the nut exceeds a predetermined value.

It is an important object of this invention to provide a nut structure for use with a helically grooved screw incorporating means for releasing the threaded engagement between the screw and nut when the axial load on the nut exceeds a predetermined value.

It is another important object of this invention to provide a nut structure for use with a helically grooved screw incorporating means limiting the maximum axial load carried by the nut.

It is still another object of this invention to provide a new and improved nut structure which may be formed by simple stamping operations and which is highly efficient in operation.

Further objects and advantages will appear from the following description and drawings, wherein.

Figure 1:
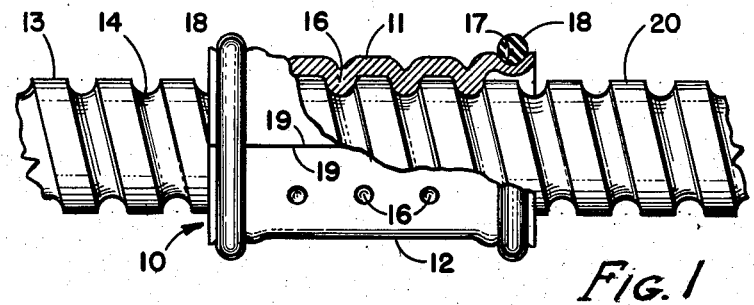
Figure 1 is a side elevation partially in longitudinal section showing the preferred nut structure according to this invention in combination with a helically grooved screw.

In the use of screws and nuts, it is often desirable to provide means that release the threaded engagement between the screw and nut when a predetermined axial load is present on the nut thus preventing overloading of the structure. A nut according to this invention satisfies this need as well as providing a simple structure which may be easily manufactured by high production stamping operations.

Referring to the drawings, a nut 10 incorporates two arcuate semi-circular segments 11 and 12, which cooperate to form a cylindrical assembly when they are placed in a face to face relationship, which is adapted to receive a screw 13 formed with a helical groove 14. Each of the semi-circular segments 11 and 12 is formed with a plurality of detents 16 which extend radially from the inner wall of the segments and simultaneously engage the surface of the groove 14. The exterior surface of each of the segments 11 and 12 is formed with a circumferential groove 17 adjacent to each end adapted to receive a resilient rubber ring 18 which urges each of the segments 11 and 12 toward the screw.

Figure 2:
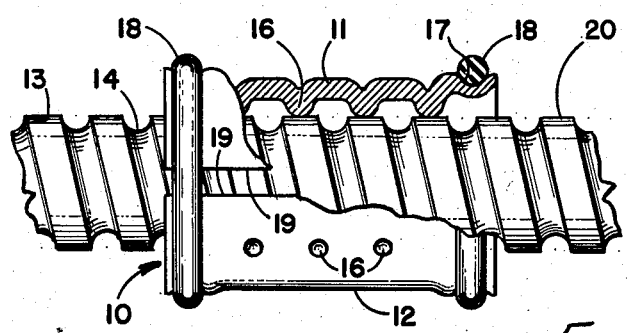
Figure 2 is a longitudinal view partially in longitudinal section showing the operation of the nut when excessive axial loads are applied thereto.
Figure 3:
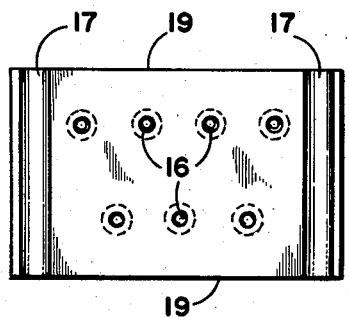
Figure 3 is a plan view of the blank used to form one of the nut segments after the first stamping operation; and, Figure 4 is a perspective view of a single segment of the preferred nut.
Figure 4:
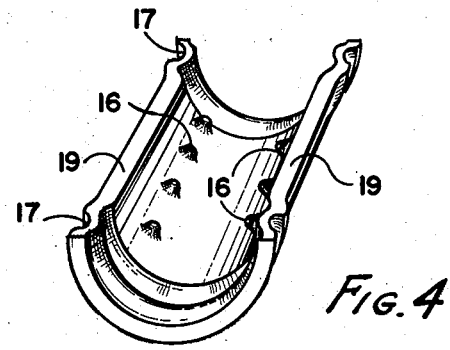

In normal operation, relative rotation between the nut 10 and the screw 13 causes the detents 16 to slide along the surface of the groove 14 and produce relative axial motion therebetween. However, when the nut is axially overloaded the sum of the radial components of force produced by the engagement between the detents 16 and the surface of the grooves 14 exceeds the forces of the rings 18 urging the segments toward the screw. This causes the two segments 11 and 12 to move radially apart thereby permitting the detents 16 to ride up out of the groove 14 and over lands 20 as shown in Figure 2. Continued rotation of the screw 13 under these overload conditions merely causes the detents 16 to ride in and out of the grooves 14, which continues as long as the nut is overloaded. It is, therefore, apparent that the simple structure shown incorporates means for releasing the threaded engagement between the nut and screw when the axial loads are excessive and prevents damage to the elements themselves and to any associated equipment to which they are attached. The detents 16 and the grooves 14 must be formed so that the area of engagement therebetween is inclined relative to a plane perpendicular to the axis of the screw and nut so that an axial force on the nut will produce a radial component of force urging the detents radially out of the grooves.

The two segments 11 and 12 are easily formed from blanks of sheet metal of the type shown in Figure 2 having side surfaces 19. Each blank is placed between dies (not shown) which are pressed toward each other thereby providing localized lateral forces on the blanks which cause metal to be displaced to form the detents 16 and the grooves 17. After this has been completed, the blank shown in Figure 2 is bent in a forming die to a semi-circular shape. The associated segment is formed in the same manner and the two are then placed in a face to face relationship with the corresponding side surfaces 19 engaging, after which the rubber rings 18 are placed in the grooves 17 thus completing the assembly of the nut.

Those skilled in the art will recognize that the above described nut may be manufactured at an extremely low unit cost and that such a nut incorporates a simple foolproof overload relief means.

Although a preferred embodiment of this invention is illustrated, it will be realized that various modifications of the structural details may be made without departing from the mode of operation and the essence of the invention. Therefore, except insofar as they are claimed in the appended claim, structural details may be varied widely without modifying the mode of operation. Accordingly, the appended claim and not the aforesaid detailed description is determinative of the scope of the invention.

I claim:

In combination, a screw formed with a helical groove providing similar opposed inclined surfaces, a nut around said screw including a plurality of arcuate segments cooperating to form a cylindrical assembly through which said screw extends, each of said segments being provided with inwardly extending detents deformed from the wall of said segments and constituting an interrupted helix engaging spaced portions of said screw groove, each of said detents providing similar opposed inclined faces normally engaging said surfaces, and resilient means substantially equally spaced from the ends of said segments resiliently urging said segments toward each other affecting the operative engagement of said detents with said screw groove, an axial load greater than a predetermined axial load between said screw and nut producing by virtue of the engagement of said faces and surfaces a radial force urging said segments apart against the action of said resilient means.

References Cited in the file of this patent

UNITED STATES PATENTS

| | | |
|---|---|---|
| 372,479 | McKee | Nov. 1, 1887 |
| 686,391 | Cox | Nov. 12, 1901 |
| 781,110 | Stulz | Jan. 31, 1905 |
| 1,108,656 | Adler | Aug. 25, 1914 |
| 1,203,546 | Parsons | Oct. 31, 1916 |
| 1,238,695 | Mumford | Aug. 28, 1917 |
| 1,360,297 | Jensen | Nov. 30, 1920 |
| 1,414,337 | Brown | May 2, 1922 |
| 1,429,645 | Schroeder | Sept. 19, 1922 |
| 1,705,811 | Eidel | Mar. 29, 1929 |
| 2,259,269 | Ruth | Oct. 14, 1941 |
| 2,294,745 | Goetz | Sept. 1, 1942 |

FOREIGN PATENTS

| | | |
|---|---|---|
| 31,207 | Switzerland | Feb. 15, 1904 |
| 285,790 | Great Britain | Jan. 3, 1929 |